United States Patent [19]

Dempsey et al.

[11] Patent Number: 4,603,680

[45] Date of Patent: Aug. 5, 1986

[54] FURNACE INDUCER OUTLET BOX ASSEMBLY

[75] Inventors: Daniel J. Dempsey; Kent L. Parker, both of Indianapolis, Ind.

[73] Assignee: Carrier Corporation, Syracuse, N.Y.

[21] Appl. No.: 679,839

[22] Filed: Dec. 10, 1984

[51] Int. Cl.⁴ ............................................. F24H 3/00
[52] U.S. Cl. ............................. 126/99 A; 126/110 R; 126/112; 126/109; 126/99 R
[58] Field of Search ............. 126/99 R, 115, 110 R, 126/99 A, 99 C, 117, 116 B, 109; 285/13; 403/37; 165/70, 71

[56] References Cited

U.S. PATENT DOCUMENTS

| | | | |
|---|---|---|---|
| 1,545,092 | 7/1925 | Ford | 285/13 X |
| 4,164,210 | 8/1979 | Hollowell | 126/110 R |
| 4,289,730 | 9/1981 | Tomlinson | 126/110 R X |
| 4,318,392 | 3/1982 | Schreiber et al. | 126/110 R |
| 4,478,206 | 10/1984 | Ahn | 126/99 A |
| 4,481,935 | 11/1984 | Bawel | 126/307 R |
| 4,515,145 | 5/1985 | Tallman et al. | 126/99 A |
| 4,537,178 | 8/1985 | Hwang et al. | 126/110 R |

*Primary Examiner*—Larry Jones
*Attorney, Agent, or Firm*—Douglas L. Miller

[57] ABSTRACT

A furnace flue gas draft inducer outlet box assembly is provided for connecting an inducer housing to a vent pipe, and comprises a plurality of differently directed openings to allow the vent pipe to be connected thereto in one of a plurality of different orientations, thereby facilitating ease of installation of the furnace. When incorporated with a condensing furnace, the inducer outlet assembly further comprises a condensate collecting system for collecting a return flow of condensate formed in a vent pipe and for delivering the condensate out of the inducer housing to prevent contact with the inducer motor, wheel and the like.

5 Claims, 13 Drawing Figures

FURNACE INDUCER OUTLET BOX ASSEMBLY

BACKGROUND OF THE INVENTION

This invention pertains to forced hot air heating furnaces, and more particularly to a furnace flue gas draft inducer outlet box assembly, hereinafter referred to as inducer outlet box assembly, directly attached to the inducer housing outlet and having a plurality of openings individually connectable to a vent, thereby providing selective attachment of the vent to accommodate installation thereof, and for collecting and delivering a return flow of condensate from the vent, thereby preventing the condensate from flowing to the inducer motor assembly, and particularly the inducer fan or wheel.

Generally, in forced hot air heating furnaces of the noncondensing-type, the vent pipe or chimney liner is maintained at a temperature above the dew point of the flue gases to prevent condensation of the water vapor in the gases within the vent pipe or chimney liner, and thus to prevent condensate from returning to the furnace and damaging or hindering the operation of any parts, such as motor assemblies, switches and the like. This is accomplished by maintaining the hot flue gases at a temperature approximately 140° F. above the flue gas water vapor dew point wherein the excess temperature heats the vent pipe or chimney liner above the flue gas water vapor's dew point. Should the vent pipe or chimney liner temperature decrease below the dew point, then the cooler temperature will cause condensation of the flue gas water vapor. Thus, in these types of furnaces, increased costs in heating, waste of heat energy, and decreased furnace heating efficiency result from maintaining the flue gases at relatively high temperatures to increase the temperature of vent pipes or chimney liners. In these types of furnaces, it is not uncommon to have furnace heating efficiencies in the range of 80% to 85% wherein the lost heating efficiency has been used to vent flue gases due to their natural buoyancy and maintain the vent pipe or chimney liner temperature above the dew point.

Increases in furnace heating efficiency have been accomplished by purposely lowering the flue gas's temperature and condensing as much of the flue gas water vapor as possible to recover a portion of sensible and latent heat therefrom. This is generally accomplished by including a condensing heat exchanger in the heat exchanger assembly and passing cool air to be heated over the condensing heat exchanger. In these types of condensing furnaces, furnace heating efficiencies higher than 90% are not uncommon.

One of the problems associated with condensing furnaces is that because the flue gases are at a temperature below the water vapor dew point due to the further cooling thereof in the condensing heat exchanger, further condensation of flue gas water vapor occurs in the vent pipe or chimney liner. This latter condensate can return to the furnace and damage or hinder operation of the inducer wheel and prevent flow of the flue gases through the heat exchanger assembly and vent pipe or chimney liner. Thus, the need exists of removing the condensate from the heating furnace prior to contacting the inducer motor assembly, and particularly the inducer wheel.

One problem associated with most furnaces, i.e., both condensing and noncondensing, occurs during the installation of the furnace. Specifically, most furnaces only permit attachment of the vent in one particular fashion. For example, the vent generally can only be connected in one manner of orientation through a top surface of the furnace or one of the side walls. Thus, where available space for installation is limited or of unusual floor design, the orientation and manner of connecting the vent is very important. For example, should a particular furnace be constructed such that the vent is only connected thereto through the left side panel, then a problem occurs when the installation space requires the vent to be connected through the right panel of the furnace. Generally, the only solutions available in a situation such as this is to face the furnace in the opposite direction so as to place the left connecting panel to the right side of the installation space or to increase the length of the vent so that it may be attached to the left panel of the furnace and routed to an exhaust opening disposed in the opposite side of the installation space. Turning the furnace around to face an opposite direction or to increase the length of the vent pipe are respectively undesirable from practical and cost effective aspects.

SUMMARY OF THE INVENTION

The present invention provides a unique inducer outlet box assembly mounted directly on the inducer housing and having multiple connection points for a vent pipe, and for collecting condensate formed in the vent pipe or chimney liner.

It is an object of the present invention to provide an improved furnace inducer outlet box assembly for use with forced hot air heating furnaces.

Another object of the present invention is to provide a furnace inducer outlet box assembly that provides a multiple number of connection points for a vent to accommodate installation of the furnace.

Yet another object of the present invention is to provide an improved furnace inducer outlet box assembly directly attached to the inducer housing outlet for collecting condensate formed over the length of the vent pipe by condensation of flue gas water vapor.

Further objects of the present invention will appear as the description proceeds.

In one form of the present invention there is provided an inducer outlet box assembly in a condensing furnace including a primary heat exchanger and a condensing heat exchanger defining a flow path leading from a source of heat for heating a fluid to an inducer draft unit having an inducer outlet and adapted for drawing the heating fluid from the heat source through the flow path to the inducer outlet, and a vent adapted for exhausting the heating fluid. The inducer outlet box assembly comprises a fluid transfer chamber connected to the inducer outlet in fluid communication therewith and having an opening connected to the vent in fluid communication therewith; the fluid transfer chamber directing the flow of heating fluid from the inducer outlet through the chamber into the vent wherein a portion of the heating fluid water vapor is condensed. A collecting device is disposed within the fluid transfer chamber and below the opening and is adapted for collecting a return flow of the condensed portion of the heating fluid water vapor from the vent.

In another form of the present invention there is provided a forced hot air heating furnace for raising the temperature of circulated air comprising a heat exchanger assembly defining a flow path for a heating fluid and having an inlet and an outlet; a heating device in proximity to the heat exchanger assembly inlet for supplying the heating fluid; an inducer draft unit having an inducer outlet for drawing the heating fluid through the flow path, the heat exchanger assembly outlet, and the inducer outlet; and a vent for exhausting the heating fluid. A fluid transfer chamber is directly interconnected in fluid communication between the inducer outlet and the vent, wherein the fluid transfer chamber includes a plurality of differently directed openings so that any one of the openings can be selectively connected to the vent. A blocking device for selectively closing off the other ones of the chamber openings is provided, whereby the vent can be selectively connected to the chamber in one of a plurality of different directions or orientations.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
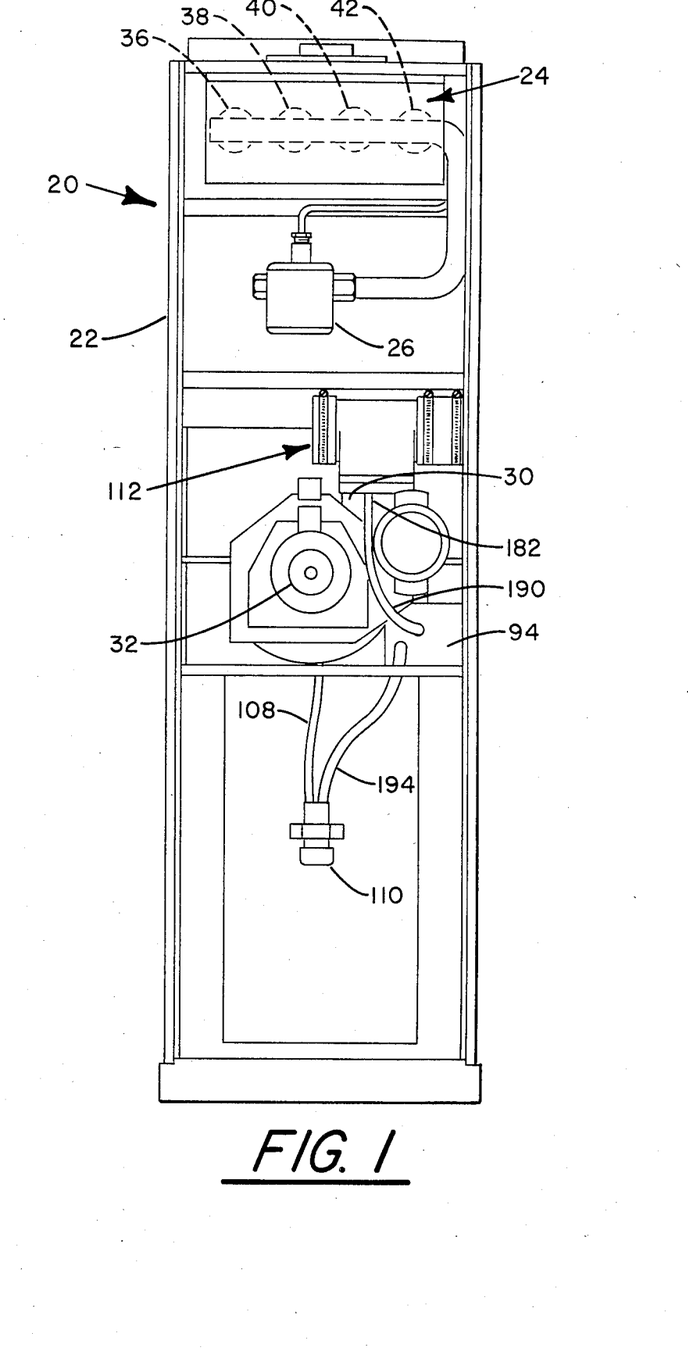
FIG. 1 is a front elevational view of a furnace with its front panels removed and incorporating one embodiment of the present invention.
Figure 2:
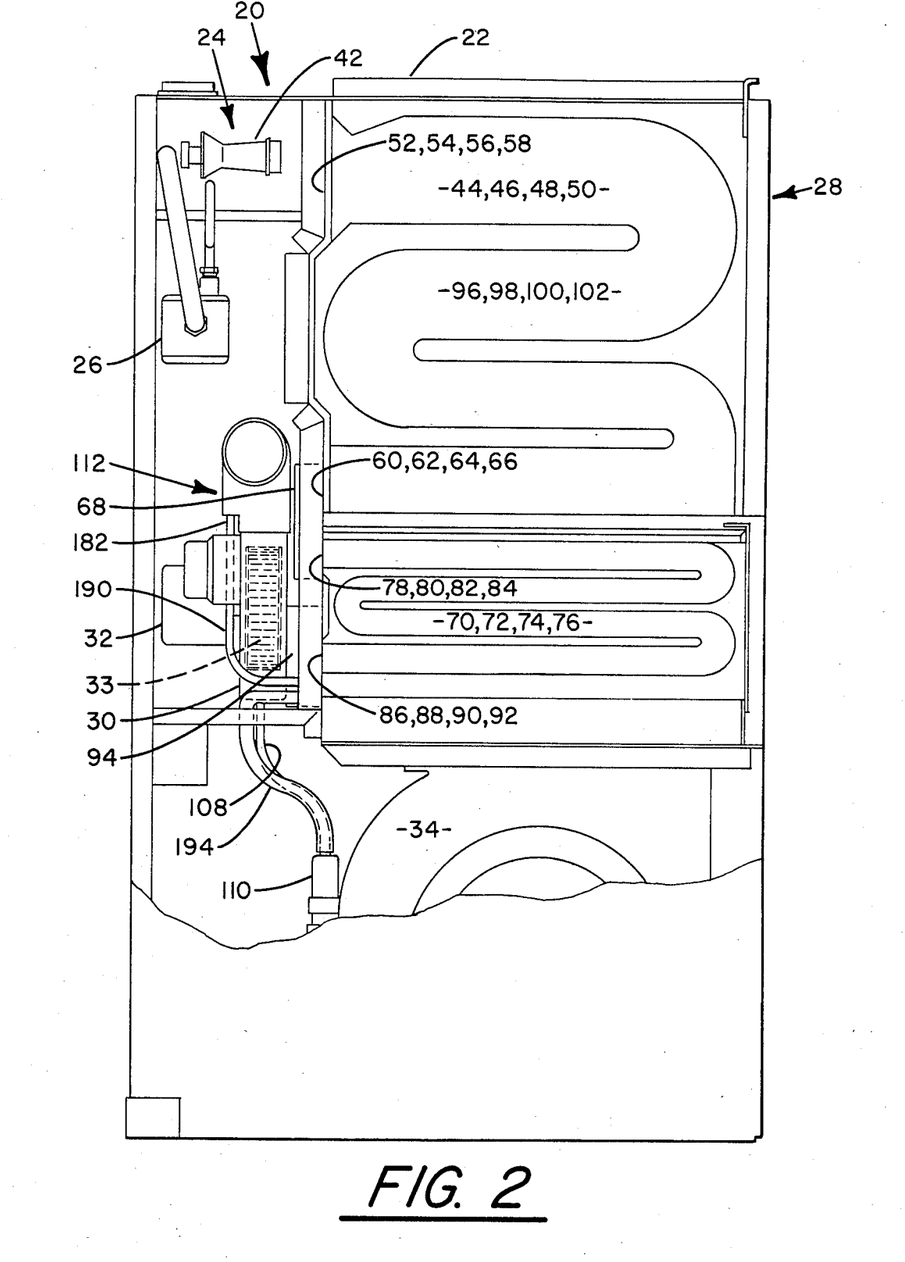
FIG. 2 is a partially broken-away side elevational view of the furnace in FIG. 1.

The following description of a preferred embodiment of the present invention is initially made with reference to condensing furnace 20, but it should be understood that the present invention contemplates incorporation with a noncondensing-type furnace. Referring to FIGS. 1 and 2, condensing furnace 20 includes in major part steel cabinet 22 housing therein burner assembly 24, gas regulator 26, heat exchanger assembly 28, inducer housing 30 supporting inducer motor 32 and inducer wheel 33, and circulating air blower 34.

Burner assembly 24 includes four inshot burners 36, 38, 40, and 42 for respective primary heat exchangers 44, 46, 48, 50, wherein only heat exchanger 50 is illustrated in FIG. 2. Burners 36-42 receive fuel gas from gas regulator 26 and inject the fuel gas into respective primary heat exchanger inlets 52, 54, 56, 58, wherein only inlet 58 is illustrated in FIG. 2. A part of the injection process includes drawing air into heat exchanger assembly 28 so that the fuel gas and air mixture may be combusted therein. Although only four inshot burners 36-42 are illustrated in conjunction with primary heat exchangers 44-50, it should be understood that a fewer or greater number of burners or primary heat exchangers can be used.

Each primary heat exchanger 44-50 winds in a serpentine manner to respective heat exchanger outlets 60, 62, 64, 66 opening into chamber 68. Connected to chamber 68 and in fluid communication therewith are condensing heat exchanger assemblies 70, 72, 74, 76, wherein only condensing heat exchanger assembly 76 is illustrated in FIG. 2. Each condensing heat exchanger assembly includes a plurality of individual condensing heat exchangers (not shown). Condensing heat exchanger assemblies 70-76 have respective condensing heat exchanger inlets 78, 80, 82, 84 and respective condensing heat exchanger outlets 86, 88, 90, 92. Outlets 86-92 open into chamber 94 for venting exhaust flue gases and condensate therein.

Inducer housing 30 is connected to chamber 94 and has mounted therewith in opening 31 inducer motor 32 with inducer wheel 33 for drawing the heating fluid heated by burner assembly 24 through heat exchanger assembly 28. Blower 34 delivers air to be heated upwardly through heat exchanger assembly 28 and the cool air passing over condensing heat exchanger assemblies 70-76 lowers heat exchanger wall temperature below flue gas dew point causing a portion of the flue gas water vapor to condense, thereby recovering a portion of the sensible and latent heat energy. The condensate formed within heat exchanger assemblies 70-76 flows through chamber 94 into drain tube 194 to condensate trap assembly 110. As blower 34 continues to urge a flow of air to be heated upwardly through heat exchanger assembly 28, heat energy is transferred from the heating fluid flowing through flow paths 96, 98, 100, 102, defined by respective heat exchangers 44-50 and heat exchanger assemblies 70-76 to heat the air circulated by blower 34.

Figure 3:
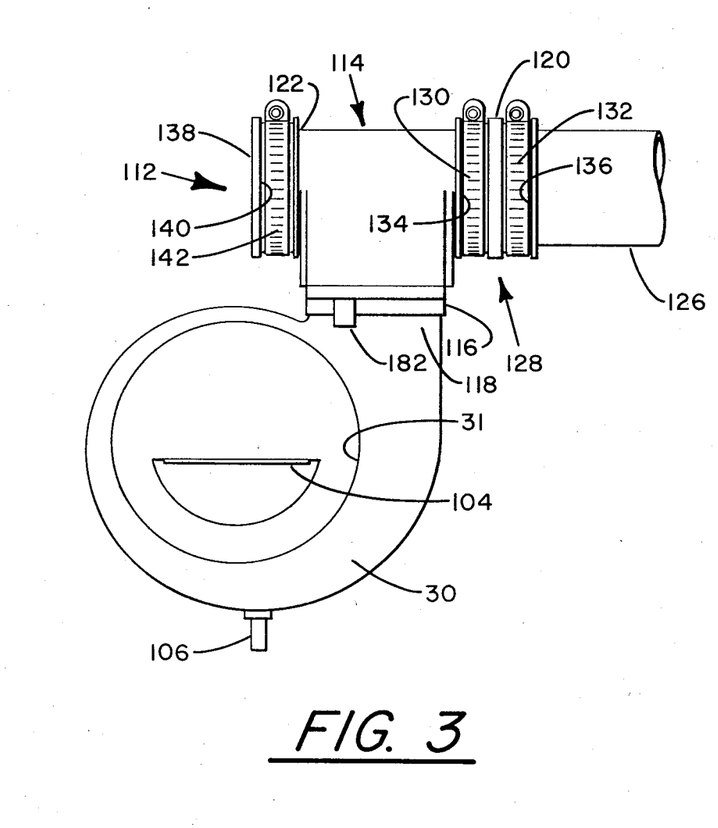
FIG. 3 is an elevational view of an inducer housing and the embodiment of the present invention in FIG. 1.
Figure 4:
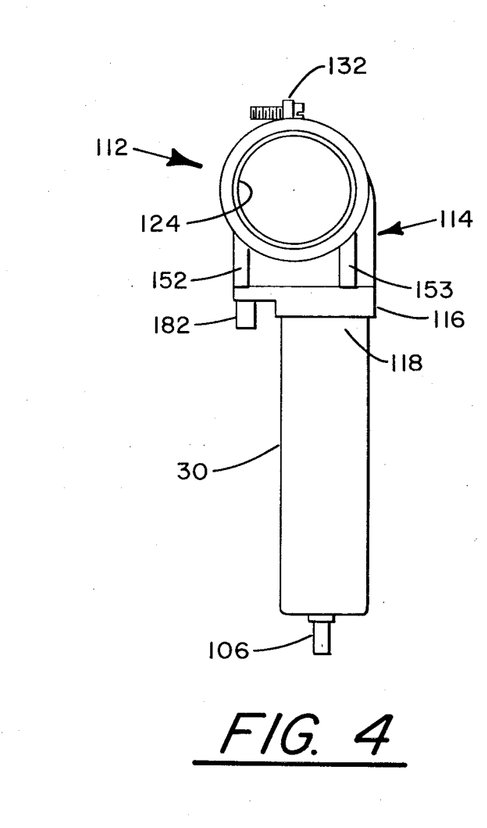
FIG. 4 is a side elevational view of the inducer housing and embodiment in FIG. 3.

As illustrated in FIG. 3, chamber 94 communicates with inducer housing 30 through housing inlet 104. Condensate formed in inducer housing 30 flows through drain 106 disposed in housing 30 and inducer drain tube 108 to condensate trap assembly 110. Because of the condensate formed in condensing heat exchanger assemblies 70-76, heat exchangers 70-76 are preferably made of a highly corrosion resistant material.

Referring primarily now to FIGS. 1-5, inducer outlet box assembly 112 of the present invention is illustrated in conjunction with condensing furnace 20. Inducer outlet box assembly 112 comprises fluid transfer chamber 114 having an inlet 116 secured in a water tight fashion to inducer outlet 118.

Fluid transfer chamber 114 includes oppositely disposed left and right vent connections 122, 124 to provide flexibility in attaching vent pipe 126 when installation is in a limited space or the like. As illustrated, vent pipe 126 is connected to right vent connection 124 by means of coupler 128 and clamps 130, 132. Coupler 128 includes a pair of parallel grooves 134, 136 for receiving respective clamps 130, 132. To install coupler 128, it is tightly fitted over vent connection 124 so that groove 134 encompasses connection 124 and clamp 130 is then tightened to provide a water and air tight connection. In a similar manner, vent pipe 126 is tightly fitted in coupler 128 and secured therein by clamp 132. Proper positioning of connection 124 and pipe 126 in coupler 128 is assisted by flange 120. The opposite vent connection 122 is blocked off by blocking cap 138 including a groove 140 peripherally disposed therein for receiving a clamp 142. Blocking cap 138, which has a closed end, is tightly fitted over vent connection 122 so that groove 140 encompasses connection 122, and clamp 142 is then tightened to provide a water and air tight closing of vent connection 122.

Referring now to FIGS. 5–13, inducer outlet assembly 112 includes fluid transfer chamber 114 having an upper portion 146 and a lower portion 148. Fluid transfer chamber 114 is made of a molded plastic material, and can be manufactured as one integral piece. Upper portion 146 includes left and right vent connections 122, 124, and further includes four threaded screw-receiving projections 150, 151, 152, 153 disposed below respective vent connections 122, 124 to permit attachment of lower portion 148 thereto. Lower portion 148 has complementary projections 154, 155, 156, 157 through which screws (not shown) are received for threaded engagement with projections 150, 151, 152, 153. Upper portion 146 further includes on its bottom peripheral edge 158 (FIG. 9) a continuous flange 160 extending downwardly therefrom.

Figure 5:
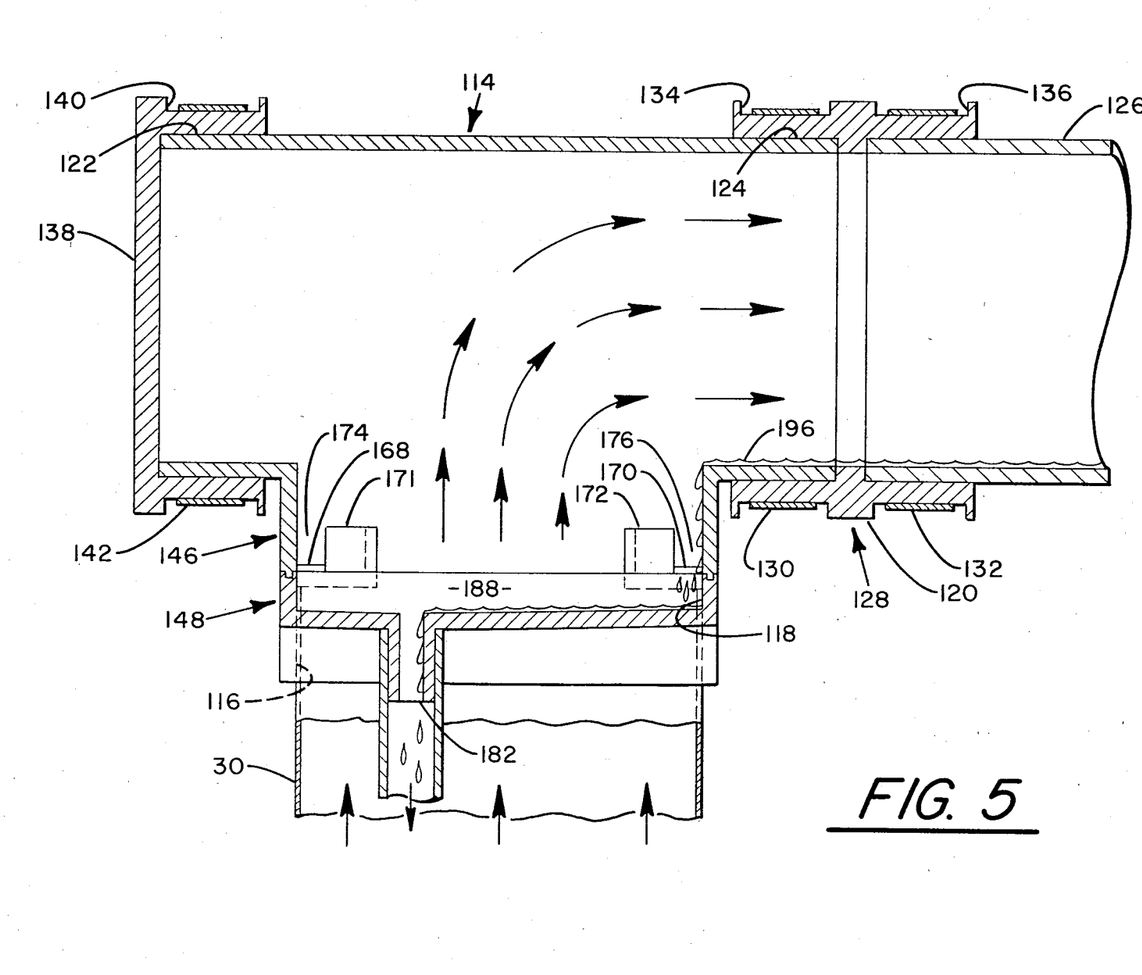
FIG. 5 is a fragmentary, broken-away sectional view of FIG. 3.
Figures 6, 7:
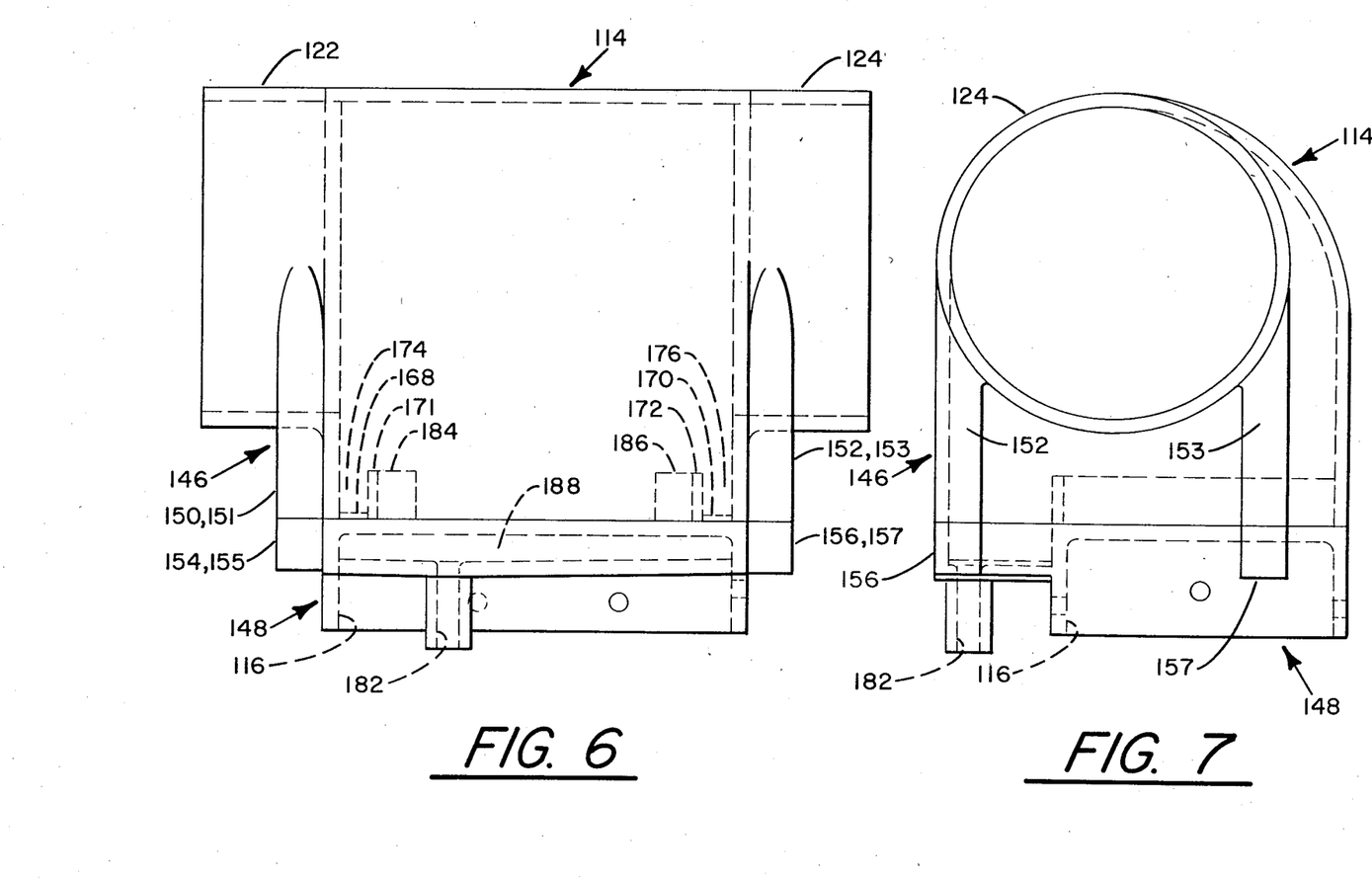
FIG. 6 is an elevational view of the embodiment of the present invention with the blocking caps removed.
FIG. 7 is a side elevational view of FIG. 6.
Figure 8:
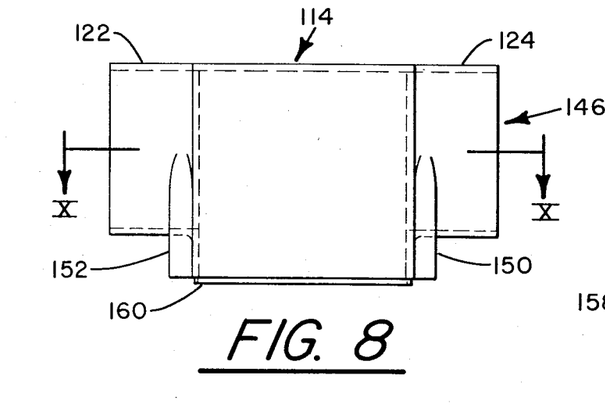
FIG. 8 is an elevational view of the upper portion of the embodiment illustrated in FIG. 6.
Figure 9:
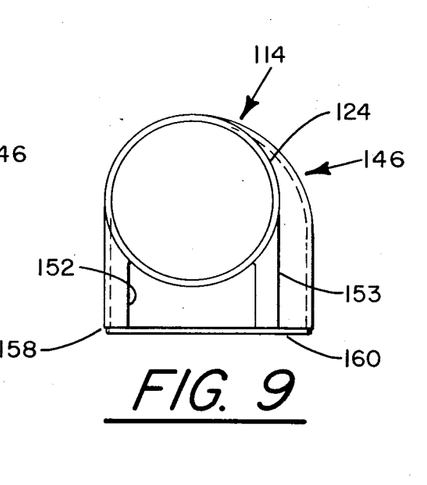
FIG. 9 is a side elevational view of FIG. 8.
Figure 10:
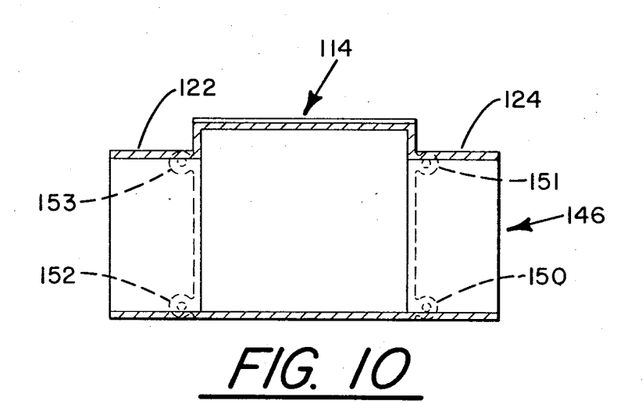
FIG. 10 is a sectional view of FIG. 8 taken along line X—X and viewed in the direction of the arrows.
Figure 11:
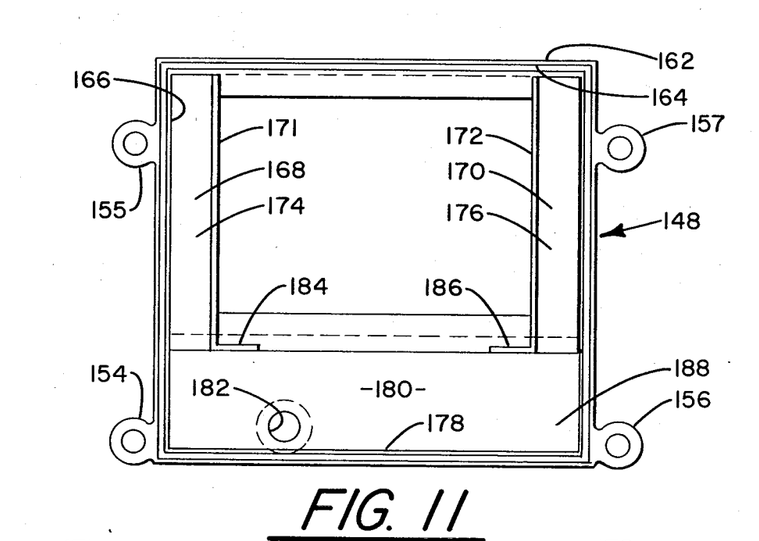
FIG. 11 is a top plan view of the lower portion of the embodiment illustrated in FIG. 6.
Figure 12:
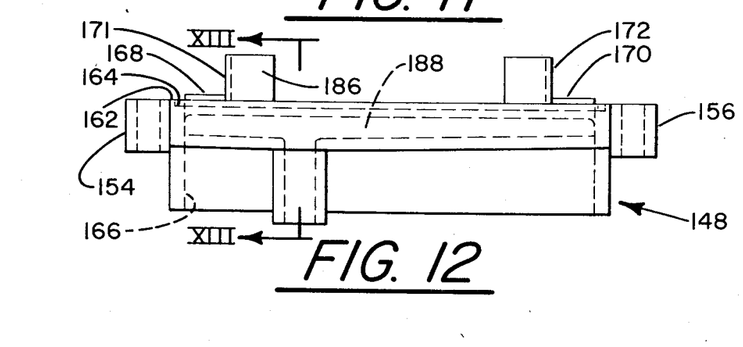
FIG. 12 is a side elevational view of FIG. 11.
Figure 13:
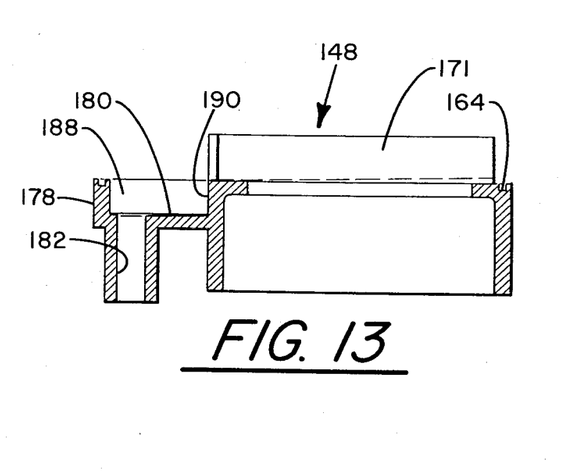
FIG. 13 is a sectional view of FIG. 12 taken along line XIII—XIII and viewed in the direction of the arrows.

Referring primarily to FIGS. 11-13, lower portion 148 includes on its upper peripheral edge 162 a continuous groove 164 for receiving flange 160. The connection between upper portion 146 and lower portion 148 should be liquid and air tight, and it is preferred that the joinder therebetween be completely sealed with a bead of suitable adhesive applied between flange 160 and groove 164 so that the fit is water tight. Lower portion 148 has continuous inner surface 166 having bottom wall 168 and bottom wall 170 extending inwardly from oppositely disposed portions thereof. As illustrated in FIGS. 5 and 11, bottom wall 168 extends from the left side and bottom wall 170 extends from the right side wherein walls 168, 170 are disposed immediately below respective vent connections 122, 124. Walls 168, 170 have extending upwardly from their respective remote peripheral edges respective partitions 171, 172, which form oppositely disposed channels 174, 176 with bottom peripheral edge 158 of upper portion 146. Both bottom walls 168, 170 slope downwardly toward lower portion side 178 (FIG. 13) from which bottom wall 180 extends inwardly of portion 148. Bottom wall 180 is disposed below bottom walls 168, 170 and includes drain outlet 182, and bottom wall 180 slopes downwardly to drain outlet 182. Partitions 171, 172 include respective portions 184, 186 disposed generally parallel to lower portion side 178 to prevent condensate from passing through the interior of fluid transfer chamber 114 and into inducer housing 30.

Since condensate forms both inside condensing heat exchanger assemblies 70–76 and vent pipe 126, it is convenient to drain the vent condensate to condensate trap assembly 110, thereby utilizing a common condensate disposal system. Since vent pipe 126 is connected to inducer housing 30 via fluid transfer chamber 114, provision is made for the vent condensate to bypass inducer housing 30, inducer motor 32, and inducer wheel 33. Thus, channels 174, 176 and channel 188, which is formed by lower portion side 178, bottom wall 180 and lower portion inner side 190 (FIG. 13), are provided for directing condensate away from inducer housing 30, motor 32, and wheel 33. Further, fluid transfer chamber 114 is designed both to minimize pressure drop between inducer housing 30 and vent pipe 126 and provide a regular, uninterrupted flow of condensate from vent pipe 126.

Referring now to FIGS. 1 and 2, drain outlet 182 is connected by drain tube 190 to chamber 94. Condensate collected in chamber 94 is then delivered by drain tube 194 to condensate trap assembly 110.

Although fluid transfer chamber 114 has been described as having only two vent connections 122, 124, which are generally horizontally oppositely disposed, the present invention contemplates chamber 114 including a greater number of vent connections oriented in any desired direction to facilitate ease of installation of condensing furnace 20.

In operation, air is drawn into burner assembly 24 and mixed with fuel gas by burners 36–42 for combustion within primary heat exchangers 44–50. The heating fluid created thereby is drawn by inducer wheel 33 through flow paths 96–102 of heat exchanger assembly 28 in heat transfer relation with circulated air urged upwardly by blower 34. Flue gases passing through condensing heat exchanger assemblies 70–76 are further cooled to recover a portion of sensible heat and latent heat from condensed water vapor, and the condensate formed thereby and the remaining flue gases are drawn through inducer housing inlet 104 into inducer housing 30. The condensate then drains through drain tube 194 to condensate trap assembly 110. The remaining flue gases are then urged through inducer housing outlet 118 into fluid transfer chamber 114 and vent pipe 126.

Further condensation of flue gas water vapor occurs in vent pipe 126 (FIG. 5) and the condensate 196 flows back to fluid transfer chamber 114. Upon passing through right vent connection 124, condensate 196 is collected in channel 176 and flows downwardly along sloping bottom wall 170 into channel 188. From channel 188, condensate 196 flows downwardly along bottom wall 180 to drain outlet 182, tube 190, chamber 94, and tube 194 to condensate assembly 110.

Should vent pipe 126 be connected to left vent connection 122, with right vent connection 124 closed by blocking cap 138, the return flow of condensate 196 is similar in that it is collected by channel 174 and delivered downwardly along bottom wall 168 to channel 188 for subsequent delivery to condensate trap assembly 110. It should be noted that portions of bottom wall 180 on opposite sides of drain outlet 182 slope downwardly towards drain outlet 182.

As described, inducer outlet box assembly 112 of the present invention provides in a condensing furnace 20 at least two different orientations or directions for connecting vent pipe 126 thereto for ease of installation, and collection and delivery of condensate formed in vent pipe 126 away from inducer housing 30, inducer motor 32, and inducer wheel 33.

The present invention has been described above in conjunction with condensing furnace 20, but the present invention may also be used in a noncondensing-type furnace, which may be similar to furnace 20 with condensing heat exchanger assemblies 70–76 removed, to provide more than one direction or means for connecting vent pipe 126 thereto. In a noncondensing-type furnace, drain outlet 182 is closed off to prevent flue gases from escaping therethrough.

While this invention has been described as having a preferred embodiment, it will be understood that it is capable of further modifications. This application is therefore intended to cover any variations, used, or adaptations of the invention following the general principles thereof, and including such departures from the present disclosure as come within known or customary practice in the art to which the invention pertains and fall within the limits of the appended claims.

What is claimed is:

1. In a furnace for raising the temperature of circulating air, comprising:
   a heat exchanger assembly defining a flow path for a heating fluid and having an inlet and an outlet,
   a heating means in proximity to said heat exchanger assembly inlet for supplying the heating fluid,
   an inducer draft means having an inducer outlet for drawing the heating fluid through said flow path, said heat exchanger assembly outlet, and said inducer outlet, and
   a vent for exhausting the heating fluid,
   an inducer outlet box assembly, comprising:
   a fluid transfer chamber being directly interconnected in fluid communication between said inducer outlet and said vent, said fluid transfer chamber including a plurality of differently directed openings being individually connectable to said vent, one of said openings being selectively connected to said vent, and
   blocking means for selectively closing off the other ones of said chamber openings, whereby said vent can be selectively connected to said chamber in one of a plurality of different directions.

2. The furnace of claim 1 further comprising collecting means in said fluid transfer chamber for collecting a return flow of a portion of the heating fluid water vapor condensed in said vent.

3. The furnace of claim 2 further comprising a condensate drain means in said inducer draft means for collecting condensate formed therein.

4. The furnace of claim 3 wherein said collecting means includes a channel adjacent an inner surface portion of said chamber and below said plurality of differently directed openings, said channel including a bottom wall member and a drain outlet in said bottom wall member, said bottom wall member sloping downwardly from said openings to said drain outlet.

5. The furnace of claim 4 further comprising a delivery means connected to said condensate drain means and said drain outlet and said condensate trap assembly for externally directing the return flow of condensate from said vent, said inducer draft means, and said chamber.

* * * * *